(12) United States Patent
Kim

(10) Patent No.: US 9,172,068 B2
(45) Date of Patent: Oct. 27, 2015

(54) BATTERY PACK

(75) Inventor: Myung-Chul Kim, Yongin-si (KR)

(73) Assignees: Samsung SDI Co., Ltd., Yongin-si (KR); Robert Bosch GmbH, Stuttgart (DE)

( * ) Notice: Subject to any disclaimer, the term of this patent is extended or adjusted under 35 U.S.C. 154(b) by 440 days.

(21) Appl. No.: 12/833,528

(22) Filed: Jul. 9, 2010

(65) Prior Publication Data

US 2011/0097614 A1   Apr. 28, 2011

Related U.S. Application Data

(60) Provisional application No. 61/254,130, filed on Oct. 22, 2009.

(51) Int. Cl.
| | |
|---|---|
| *H01M 2/12* | (2006.01) |
| *H01M 10/50* | (2006.01) |
| *H01M 2/02* | (2006.01) |
| *H01M 10/625* | (2014.01) |
| *H01M 10/647* | (2014.01) |
| *H01M 10/6555* | (2014.01) |
| *H01M 10/6561* | (2014.01) |
| *H01M 10/613* | (2014.01) |
| *H01M 2/10* | (2006.01) |

(52) U.S. Cl.
CPC .......... *H01M 2/0237* (2013.01); *H01M 2/1077* (2013.01); *H01M 10/613* (2015.04); *H01M 10/625* (2015.04); *H01M 10/647* (2015.04); *H01M 10/6555* (2015.04); *H01M 10/6561* (2015.04); *H01M 2/0217* (2013.01); *H01M 2/1061* (2013.01)

(58) Field of Classification Search
None
See application file for complete search history.

(56) References Cited

U.S. PATENT DOCUMENTS

| | | | |
|---|---|---|---|
| 4,344,748 A | | 8/1982 | Oxenreider et al. |
| 5,800,942 A | * | 9/1998 | Hamada et al. ............... 429/148 |
| 6,326,103 B1 | * | 12/2001 | Ido et al. ....................... 429/156 |
| 6,610,439 B1 | * | 8/2003 | Kimoto et al. .................. 429/90 |
| 8,124,262 B2 | | 2/2012 | Okada et al. |
| 8,268,474 B2 | | 9/2012 | Kim et al. |
| 8,293,397 B2 | | 10/2012 | Uchida et al. |
| 2006/0078786 A1 | * | 4/2006 | Wu ................................. 429/62 |
| 2006/0083984 A1 | * | 4/2006 | Oh et al. ....................... 429/176 |

(Continued)

FOREIGN PATENT DOCUMENTS

| | | |
|---|---|---|
| CN | 1776934 A | 5/2006 |
| CN | 101366132 A | 2/2009 |

(Continued)

OTHER PUBLICATIONS

Examiner Annotated Figure 1a of Fassnacht et al.*

(Continued)

*Primary Examiner* — Ula C Ruddock
*Assistant Examiner* — Matthew Van Oudenaren
(74) *Attorney, Agent, or Firm* — Christie, Parker & Hale, LLP

(57) ABSTRACT

A battery pack including a plurality of battery units with improved insulating and cooling properties between the battery units is provided. In one embodiment, a battery unit includes a battery cell and an insulating wall including a plurality of protrusions contacting the battery cell. The protrusions extend at least partly between opposite edges of the insulating wall and define space between the battery cell and regions between the protrusions.

10 Claims, 11 Drawing Sheets

(56) References Cited

U.S. PATENT DOCUMENTS

2006/0204840 A1* 9/2006 Jeon et al. .................... 429/152
2008/0299449 A1 12/2008 Yun et al.
2009/0104512 A1* 4/2009 Fassnacht et al. ............ 429/120

FOREIGN PATENT DOCUMENTS

| EP | 0 169 179 | | 1/1986 |
|---|---|---|---|
| EP | 0 952 620 A1 | | 10/1999 |
| JP | 08-321329 | | 12/1996 |
| JP | 09-120809 | | 5/1997 |
| JP | 2002-042753 | | 2/2002 |
| JP | 2005-63681 | | 3/2005 |
| JP | 2005-197179 | | 7/2005 |
| JP | 2006-066322 | | 3/2006 |
| JP | 2006-172882 | | 6/2006 |
| JP | 2007-048750 | | 2/2007 |
| JP | 2007-299544 | | 11/2007 |
| JP | 2008-159439 | * | 7/2008 |
| JP | 2008-166191 | | 7/2008 |
| JP | 2008-282625 | | 11/2008 |
| JP | 2009-054403 | | 3/2009 |
| JP | 2009-110833 | | 5/2009 |
| KR | 10-2008-0016044 A | | 2/2008 |
| WO | WO 01/28008 A1 | | 4/2001 |
| WO | WO2010019764 | * | 2/2010 |

OTHER PUBLICATIONS

KIPO Office action dated Jul. 29, 2011, for Korean application No. 10-2010-0052351, pp. 1-3.
European Office action dated Dec. 8, 2011, for corresponding European Patent application 10188237.1, noting references previously submitted in an IDS dated Feb. 24, 2011, 5 pages.
European Search Report dated Jan. 19, 2011, for corresponding European Patent application 10188237.1, noting listed references in this IDS.
Japanese Office action dated Nov. 27, 2012, for corresponding Japanese Patent application 2010-234180, (5 pages).
Patent Abstracts of Japan, and English machine translation of Japanese Publication 2008-282625 listed above, (8 pages).
SIPO Office action dated Jan. 2, 2014, for corresponding Chinese Patent Application No. 201010514554.5 (8 pages), and English Translation (10 pages).
SIPO Certificate of Patent dated Dec. 10, 2014, for corresponding Chinese Patent application 201010514554.5, (21 pages).
Patent Abstracts of Japan, and English machine translation for Japanese Publication 2005-63681 dated Mar. 10, 2005, listed above, (29 pages).

* cited by examiner

BATTERY PACK

CROSS-REFERENCE TO RELATED APPLICATIONS

This application claims priority to and the benefit of U.S. Provisional Application No. 61/254,130, filed on Oct. 22, 2009, in the United States Patent and Trademark Office, the disclosure of which is incorporated herein in its entirety by reference.

BACKGROUND

1. Field

An aspect of an embodiment of the present invention relates to a battery pack.

2. Description of Related Art

Rechargeable batteries are rechargeable, unlike primary batteries that are not designed to be rechargeable. Rechargeable batteries have been widely used in vehicles as well as other electronic devices such as cellular phones, notebook computers and camcorders.

A rechargeable battery includes an electrode assembly and an electrolyte. The electrode assembly includes a cathode plate, an anode plate and a separator. Mostly, the electrolyte includes lithium ions. Each of the cathode and anode plates may include an electrode tab extending to the outside.

The electrode assembly may be contained in a case, and an electrode terminal may extend out of the case. The electrode tab may extend out of the electrode assembly so as to be electrically connected to the electrode terminal. The case may have a circular or square shape.

A battery pack may be formed by horizontally or vertically stacking a plurality of unit battery cells of a rechargeable battery. Each unit battery cell of the battery pack needs to be protected from the outside, and rechargeable batteries that are stacked adjacent to each other need to be insulated from each other.

SUMMARY

An aspect of an embodiment of the present invention provides a battery pack including at least one battery cell with improved insulating and cooling properties between battery cells.

According to an embodiment of the present invention, a battery unit includes a battery cell and an insulating wall including a plurality of protrusions contacting the battery cell. The protrusions extend at least partly between opposite edges of the insulating wall and define space between the battery cell and regions between the protrusions.

The insulating wall may further include at least one supporting member protruding from an edge thereof for holding the battery cell against the protrusions.

The battery unit may further include at least one second insulating wall protruding from at least one edge of the insulating wall in a same direction as the protrusions, wherein one or more of the walls may include at least one supporting member protruding from an edge thereof for holding the battery cell against the protrusions.

The wall may have openings along the opposite edges and aligned with the regions between the protrusions. The openings along the opposite edges may be aligned with each other.

The plurality of protrusions may be parallel to each other.

The insulating wall may have a plurality of second openings at the regions between the protrusions. The plurality of second openings may include a plurality of elongated openings extending at least partly between the openings along the opposite edges. The plurality of second openings may include a plurality of holes spaced apart from each other between the openings along the opposite edges.

The battery unit may further include at least one second insulating wall protruding in a same direction as the protrusions from at least one of the opposite edges of the insulating wall. The at least one second insulating wall may have an opening aligned with a vent member of the battery cell.

The battery unit may further include at least one second insulating wall protruding from the insulating wall and extending between the opposite edges along the insulating wall.

The battery unit may further include a radiation sheet on a side of the insulating wall opposite the side on which the protrusions are located.

According to another embodiment of the present invention, a battery pack includes a frame and a battery module on the frame, the battery module including a plurality of battery units stacked together. Each of the battery units includes a battery cell and an insulating wall including a plurality of protrusions contacting the battery cell, the protrusions extending at least partly between opposite edges of the insulating wall and defining space between the battery cell and regions between the protrusions.

Each of the battery units may further include at least one second insulating wall protruding from at least one edge of the insulating wall in a same direction as the protrusions, wherein one or more of the walls may include at least one supporting member protruding from an edge thereof for holding the battery cell against the protrusions.

The at least one second insulating wall may include at least one second protrusion on an outside surface thereof and protruding away from the battery cell, and the at least one second protrusion may be configured to engage a receiving portion of the frame.

The frame may include a plurality of openings aligned with said space.

According to the exemplary embodiments of the present invention, in a battery pack including at least one battery cell, the insulating and cooling properties between battery cells may be improved.

DETAILED DESCRIPTION

Hereinafter, the present invention will be described in detail by explaining exemplary embodiments thereof with reference to the attached drawings.

Figure 1:
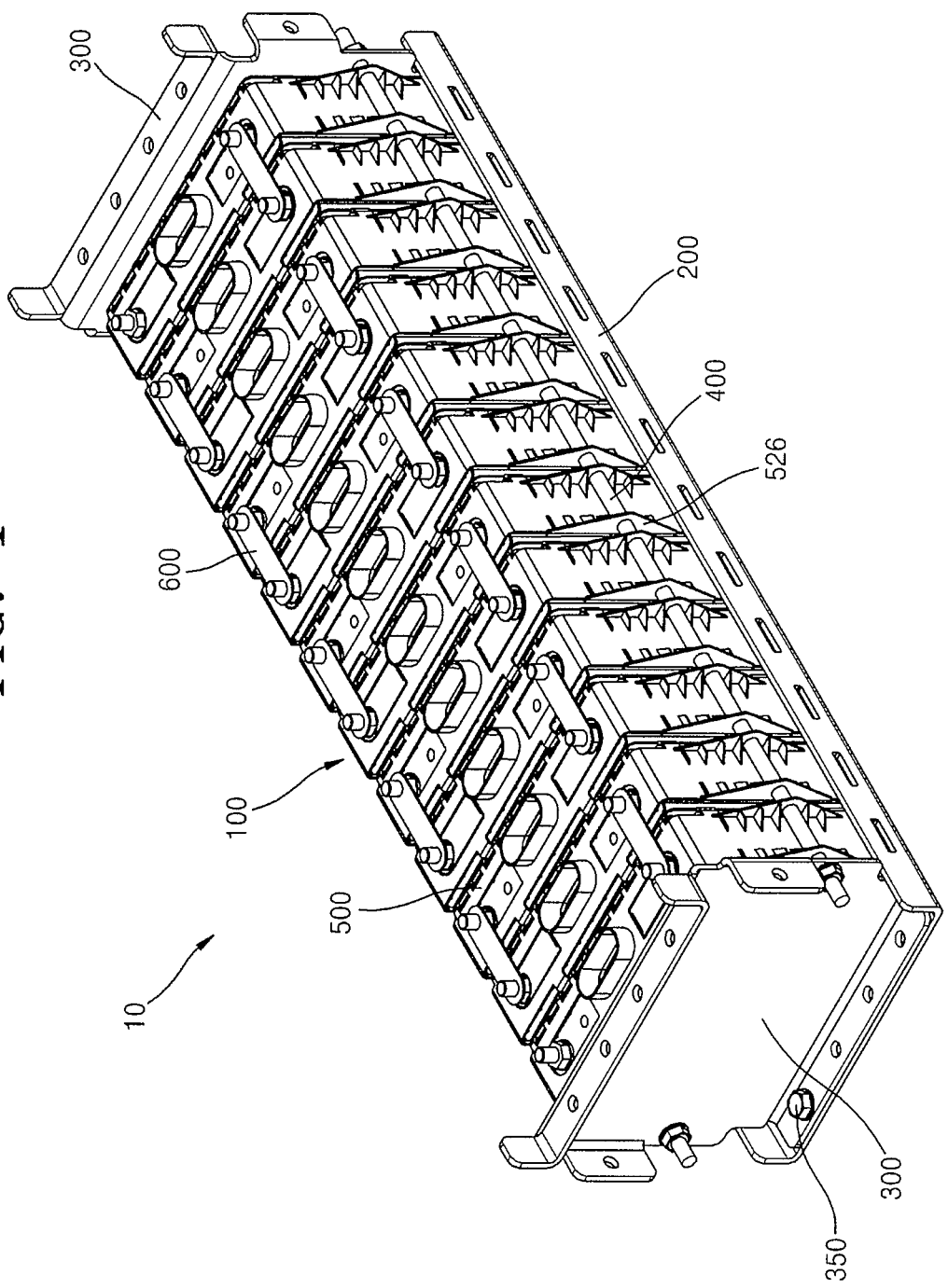
FIG. 1 is a perspective view of a battery pack in which a plurality of battery cells are stacked in a horizontal direction, according to an embodiment of the present invention.
Figure 2:
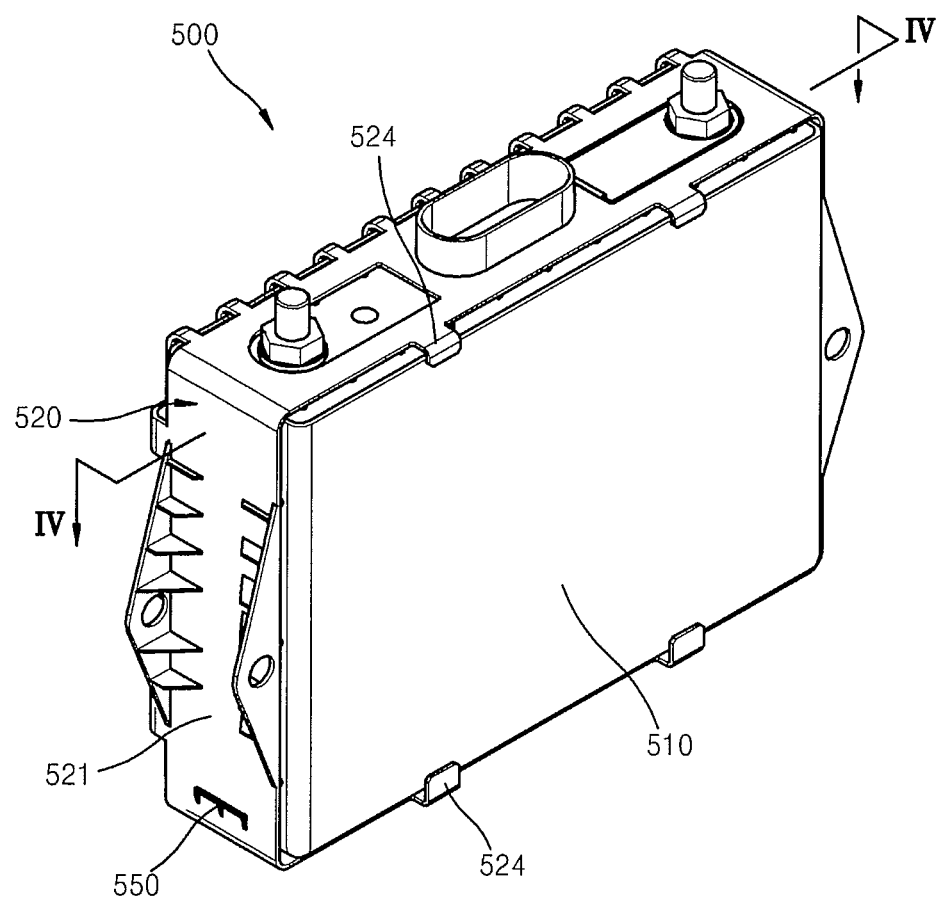
FIG. 2 is a perspective view of a battery unit in which a unit battery cell is in a cell cover in the battery pack of FIG. 1, according to an embodiment of the present invention.
Figure 3:
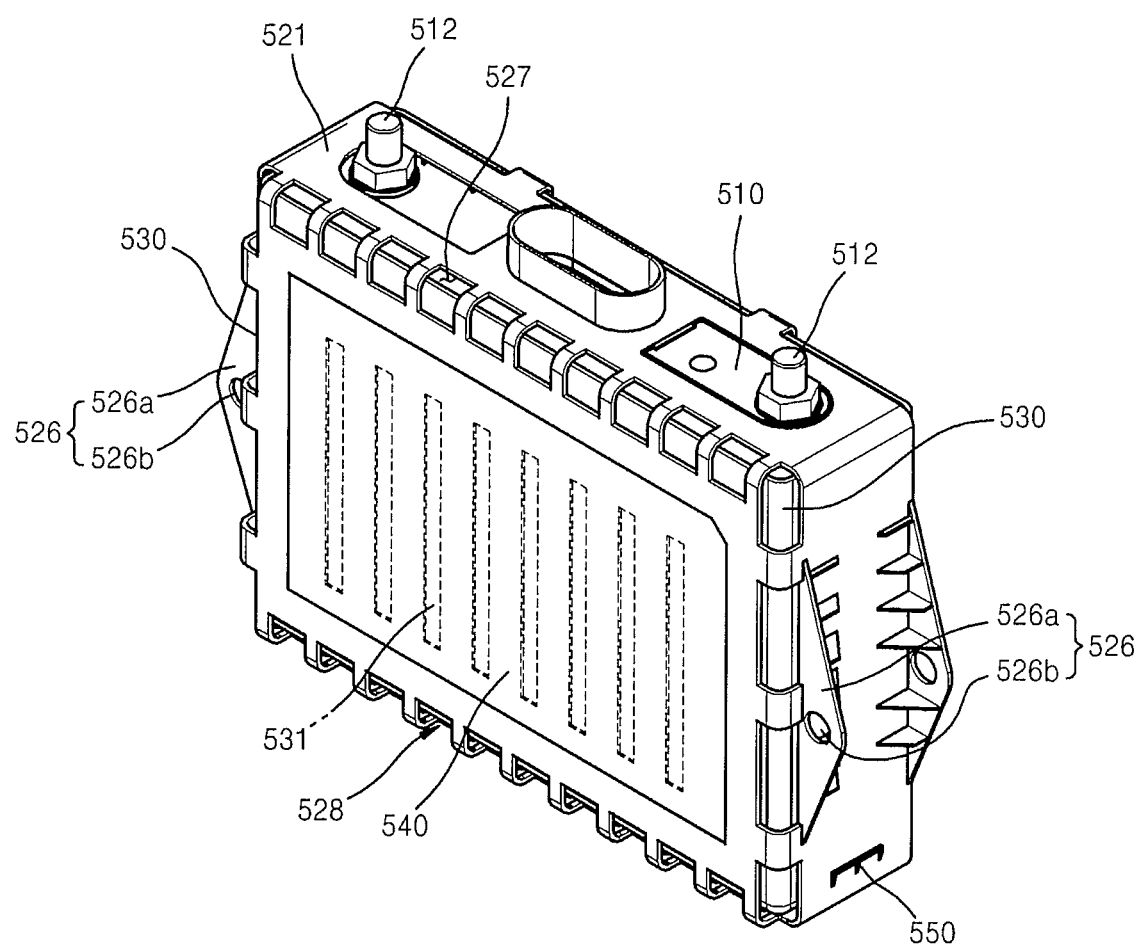
FIG. 3 is a perspective view of the battery unit of FIG. 2, which is viewed from the opposite side of FIG. 2, according to another embodiment of the present invention.
Figure 4:
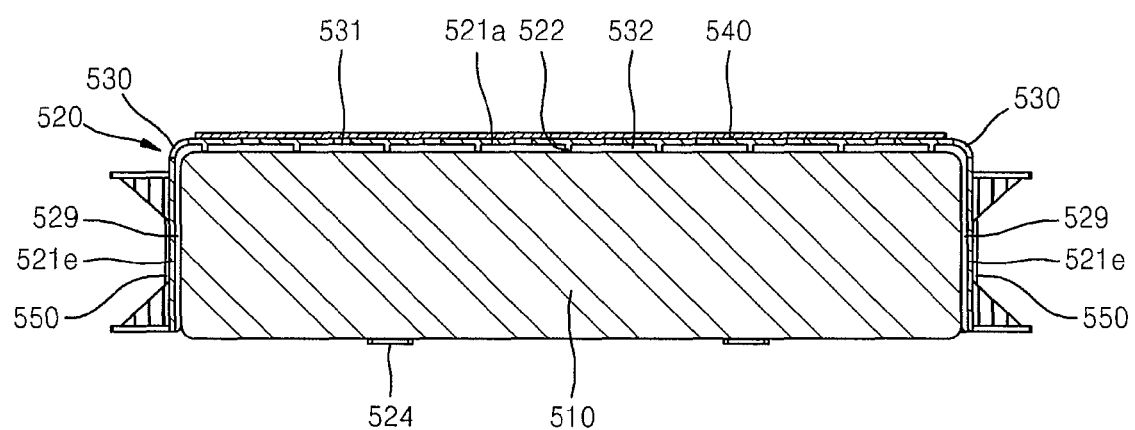
FIG. 4 is a cross-sectional view of the battery unit taken along a line IV-IV of FIG. 2, according to an embodiment of the present invention.
Figure 5:
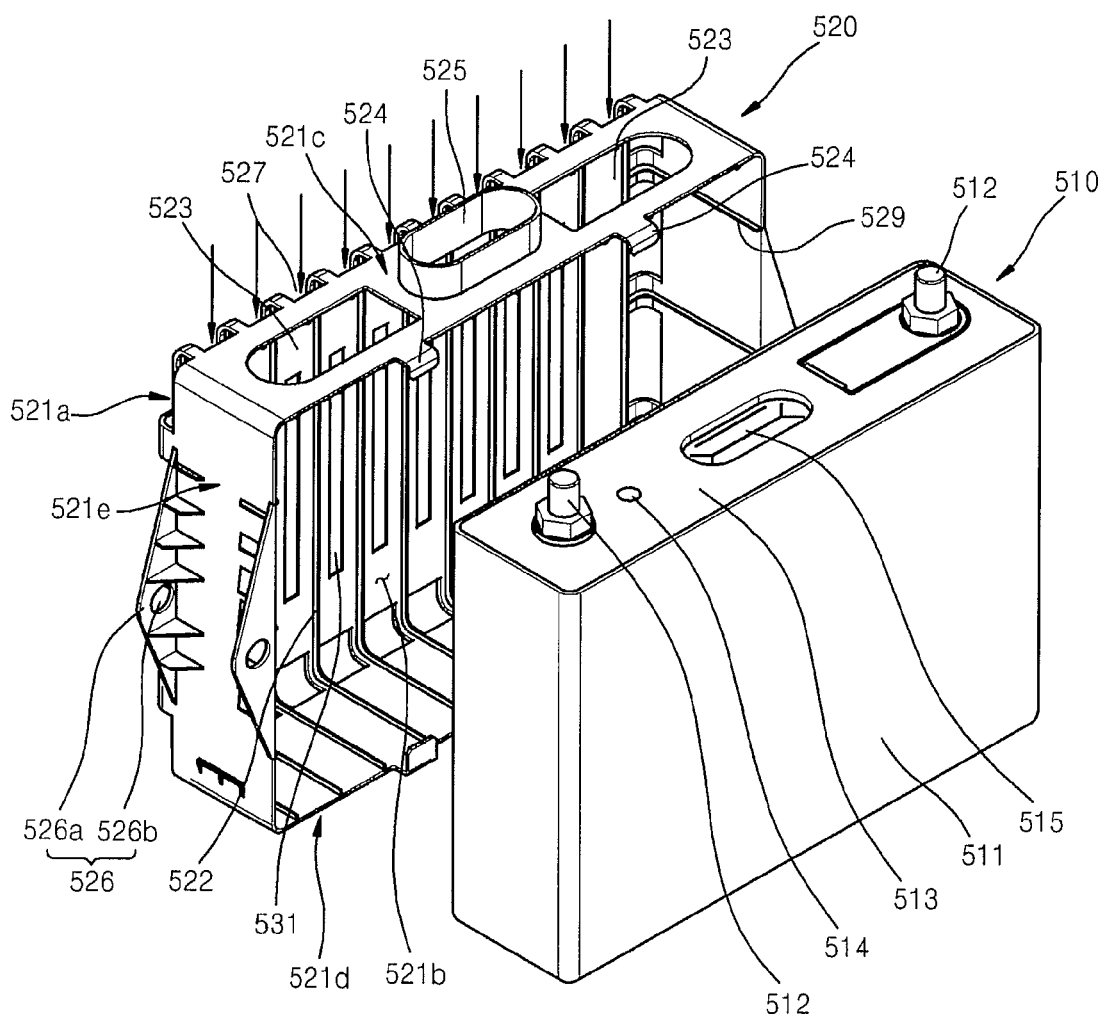
FIG. 5 is a perspective view of the battery unit where a battery cell and a cell cover are separated from each other, according to another embodiment of the present invention.

FIG. 1 is a perspective view of a battery pack 10 in which a plurality of battery cells 510 are horizontally stacked, according to an embodiment of the present invention. FIG. 2 is a perspective view of a battery unit 500 in which a battery cell 510 is in a cell cover 520 in the battery pack 10, according to an embodiment of the present invention. FIG. 3 is a perspective view of the battery unit 500 of FIG. 2, which is viewed from the opposite side of FIG. 2, according to another embodiment of the present invention. FIG. 4 is a cross-sectional view of the battery unit 500 taken along a line IV-IV of FIG. 2, according to an embodiment of the present invention. FIG. 5 is a perspective view of the battery unit 500 where the battery cell 510 and the cell cover 520 are separated from each other, according to another embodiment of the present invention.

Referring to FIGS. 1 through 5, the battery pack 10 may include at least one battery cell 510, and may be formed by stacking a plurality of battery units 500 together. The battery pack 10 may include a battery module 100, a frame 200, cover plates 300, and an assembly bar 400.

The battery module 100 is an aggregate of a plurality of battery units 500, and is formed by horizontally stacking the battery units 500. The battery module 100 may be mounted on the frame 200 so that the battery module 100 is supported by the frame 200 from below.

The cover plates 300 may be disposed at both ends of the battery module 100 so as to horizontally support the battery module 100 in which the battery units 500 are horizontally stacked. The assembly bar 400 may connect the battery units 500, which are horizontally stacked, to each other and support the battery units 500.

In FIG. 1, the battery module 100 includes the battery units 500 that are horizontally stacked. However, the present invention is not limited thereto. That is, unlike in FIG. 1, the battery module 100 that is an aggregate of the battery units 500 may be formed by vertically stacking the battery units 500.

In one embodiment of the present invention, the battery module 100 is mounted on the frame 200 so that the battery module 100 may be supported from the side, and the battery module 100 may be vertically supported by the cover plate 300. In addition, the assembly bar 400 may connect the battery units 500, which are vertically stacked, to each other and support the battery units 500. However, when the battery units 500 are vertically stacked, the features and aspects of embodiments of the present invention, which will be described hereinafter, may also be used.

Each of the battery units 500, which are horizontally stacked to form the battery module 100, may include the battery cell 510 and the cell cover 520.

The battery cells 510 may be horizontally stacked so as to form the battery pack 10. Each of the battery cells 510 may be a square battery cell, as illustrated in FIGS. 1 through 5. However, the present invention is not limited thereto. That is, battery cells having various suitable shapes including a circular shape may be used as the battery cell 510.

A general rechargeable battery may be used as the battery cell 510. The rechargeable battery may include an electrode assembly and an electrolyte. The electrode assembly may include a cathode plate, an anode plate and a separator. The electrolyte may include lithium ions. Each of the cathode and anode plates may include an electrode tab extended to the outside.

The electrode assembly may be in a case 511. Electrode terminals 512 may be exposed out of the case 511. The electrode tab may extend out of the electrode assembly so as to be electrically connected to the electrode terminals 512. The case 511 may have a circular or square shape.

The battery module 100 may be formed by horizontally or vertically stacking together a plurality of rechargeable batteries. The electrode terminals 512 of the rechargeable batteries that are stacked adjacent to each other in the battery module 100 may be electrically connected to each other. In one embodiment, the electrode terminals 512 of the rechargeable batteries that are stacked adjacent to each other may be electrically connected by a bus bar 600.

A cap plate 513 (e.g., a thin plate) may be coupled to an opening of the case 511. An electrolyte inlet for injecting an electrolyte into the case 511 may be formed in the cap plate 513, and a sealing cap 514 may be installed in the electrolyte inlet.

A vent member 515 in which a groove is formed may be installed or fabricated on the cap plate 513 so as to be torn or ruptured by a set internal pressure. When the battery cell 510 is installed in the cell cover 520, a gas exhausting unit 525 of the cell cover 520 may be positioned to be aligned with the vent member 515.

The cell cover 520 may surround at least a portion of the battery cell 510 so as to protect the battery cell 510 from the outside. In the battery pack 10 including at least one battery cell 510, the cell cover 520 may improve the insulating and cooling properties between the battery cells 510.

The cell cover 520 may include a cover body 521, vertical ribs 522, terminal insertion holes 523, cell supporting units 524, the gas exhausting unit 525, and an assembly unit 526.

The cover body 521 may surround at least a portion of the battery cell 510 so as to protect the battery cell 510 from the outside. At least one vertical rib 522 is formed on a surface of the cover body 521 so that the cover body 521 and the battery cell 510 may be spaced apart from each other.

Each of the terminal insertion holes 523 is a through-hole formed through an upper surface of the cover body 521 so that the electrode terminals 512 of the battery cell 510 are inserted into the terminal insertion holes 523. The cell supporting units 524 supports the battery cell 510 in the cell cover 520 towards or against the inside of the cell cover 520.

The gas exhausting unit 525 is a through hole formed through an upper surface of the cover body 521 so as to correspond to the vent member 515 of the battery cell 510 in the cell cover 520. The assembly unit 526 may be coupled to that of another adjacent battery unit 500 so as to fix or secure the battery units 500.

The cover body 521 surrounds at least one surface of the battery cell 510 so as to protect the battery cell 510 from the outside. In this case, at least one side of the cover body 521 may be opened, and the battery cell 510 may be inserted into and ejected from the cell cover 520 through the opened side of the cover body 521.

The cover body 521 may be formed of an insulating material and may include a plurality of insulating walls. Thus, the cover body 521 may electrically insulate the battery cell 510 in the cell cover 520 from other battery cells 510 that are stacked adjacent to each other.

In one embodiment, the cover body 521 may be formed of a plastic material. Thus, a light and inexpensive material such as plastic may be used to insulate the battery cell 510 in the cell cover 520 from other adjacent battery cells 510 and to protect the battery cell 510 in the cell cover 520 from the outside. However, the present invention is not limited thereto, and thus the cover body 521 may be formed of various suitable insulating materials in addition to plastic.

In addition, a cooling path between the battery cells 510 may be obtained. In particular, the cooling path using air circulation may be obtained between the adjacent battery cells 510.

When a subsidiary wall formed of aluminium or metal is inserted or anodized in order to obtain an air path for insulation and cooling between battery cells, maintenance of insulation between the battery cells may not be ensured. However, when the cover body 521 is formed of an insulating material, insulation and cooling may be easily obtained between the adjacent battery cells 510.

The cover body 521 may include a first surface 521a, a second surface 521b, an upper surface 521c, a lower surface 521d, and both lateral surfaces 521e.

The first surface 521a is a supporting surface for supporting the battery cell 510 in the cover body 521. The second surface 521b faces an opening side through which the battery cell 510 is inserted into and ejected from the cell cover 520.

The upper surface 521c is a surface for protecting the battery cell 510 from above. The lower surface 521d is a surface for supporting the battery cell 510 from below. The lateral surfaces 521e are surfaces for supporting and protecting the battery cell 510 from the sides.

The first surface 521a may support the battery cell 510 inserted into the cell cover 520, and may be inserted between the battery cell 510 and the adjacent battery cell 510 that is stacked adjacent to the battery cell 510. Thus, the adjacent battery cells 510 may be spaced apart from each other by the first surface 521a formed of an insulating material. The first surface 521a may be a surface of a thin plate, wherein the vertical rib 522 is formed on at least one surface of the thin plate.

At least one vertical rib 522 may be vertically formed on a surface of the cover body 521, such as the first surface 521a, so that the cover body 521 and the battery cell 510 are spaced apart from each other. According to one embodiment, the vertical rib 522 may be formed on an internal surface such as the second surface 521b. However, the present invention is not limited thereto, and the vertical rib 522 may be formed on at least one of internal and external surfaces of the cover body 521 (e.g., first surface 521a and second surface 521b).

An air path 532 may be formed to extend upwards or downwards in a space between the first surface 521a and the battery cell 510 that are spaced apart from each other. By circulating air through the air path 532, heat generated from the battery cell 510 or another element may be effectively emitted to the outside.

Figure 6:
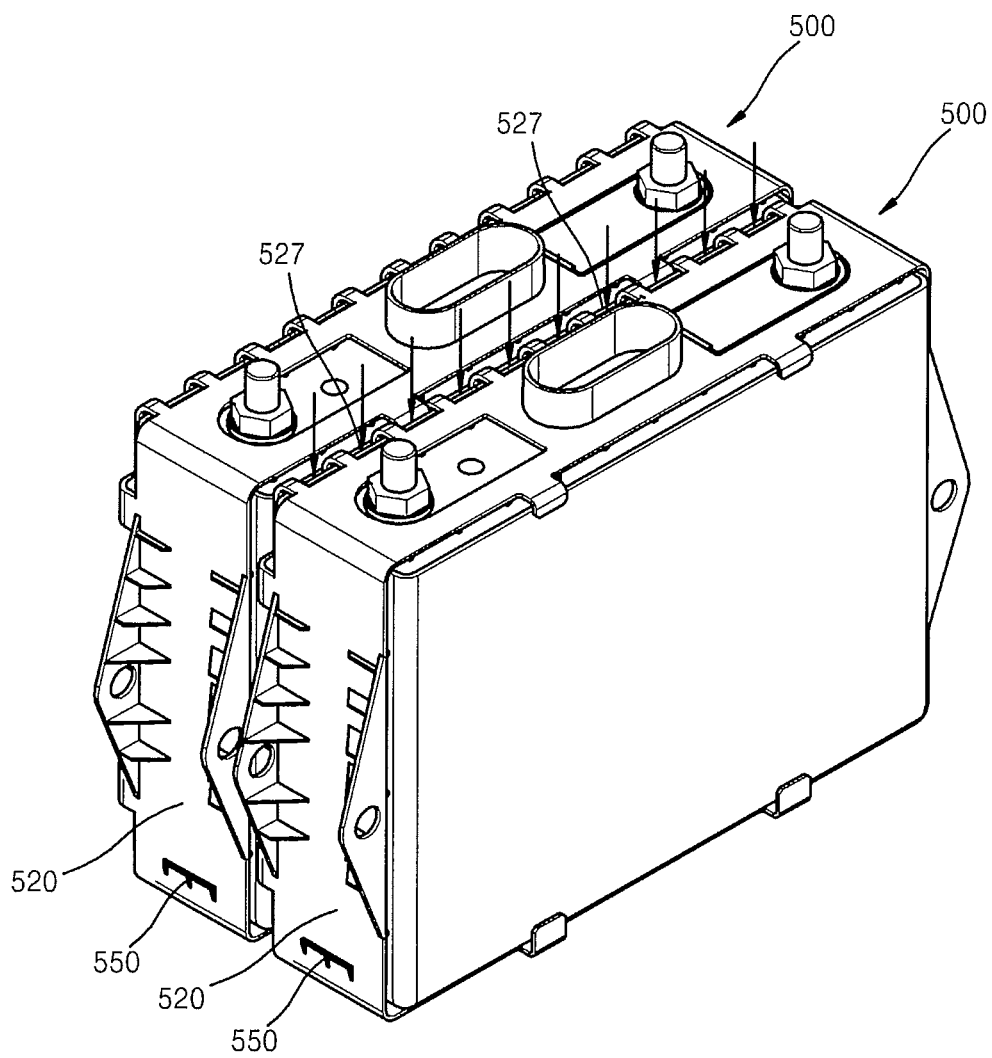
FIG. 6 is a perspective view illustrating two battery units stacked adjacent to each other in the battery pack of FIG. 1, according to an embodiment of the present invention.

Thus, the performance of heat dissipation of the battery pack 10 may be improved, and therefore the electrical performance of the battery pack 10 may be improved. FIGS. 5 and 6 illustrate an embodiment where air is circulated downwards (arrow direction). However, the present invention is not limited to this embodiment. That is, the positions of an air inlet 527 and an air outlet 528 may be reversed, and air may be circulated upwards.

To achieve this, the air inlet 527 and the air outlet 528 may be formed on the cell cover 520. The air inlet 527 may be formed on the upper surface 521c of the cover body 521, or on an edge joining the upper surface 521c and the first surface 521a. The air outlet 528 may be formed on the lower surface 521d of the cover body 521, or on an edge joining the lower surface 521d and the first surface 521a.

Thus, the air path 532 may be formed from the air inlet 527 to the air outlet 528 through a space between the first surface 521a of the cover body 521 and the battery cell 510, which is formed by the adjacent vertical ribs 522. In addition, slits 531 may be formed on the first surface 521a of the cover body 521 in spaces between the adjacent vertical ribs 522 so as to effectively emit heat generated from the battery cell 510.

The cell cover 520 may further include a radiation sheet 540. The radiation sheet 540 may be attached to an external surface of the cover body 521 such as the first surface 521a. Thus, the radiation sheet 540 may contact the battery cell 510 of the adjacent battery unit 500 that is stacked adjacent to the battery unit 500.

In this case, heat generated from the battery cell 510 of the adjacent battery unit 500 that is stacked adjacent to the battery unit 500 may be emitted via the radiation sheet 540 and through the air path 532 formed in the cell cover 520. In addition, heat generated from the battery cell 510 of the adjacent battery unit 500 that is stacked adjacent to the battery unit 500, which is transmitted through the radiation sheet 540, may be effectively transmitted to the air path 532 by the slits 531 formed in spaces between the adjacent vertical ribs 522 of the first surface 521a of the cover body 521.

Figure 7:
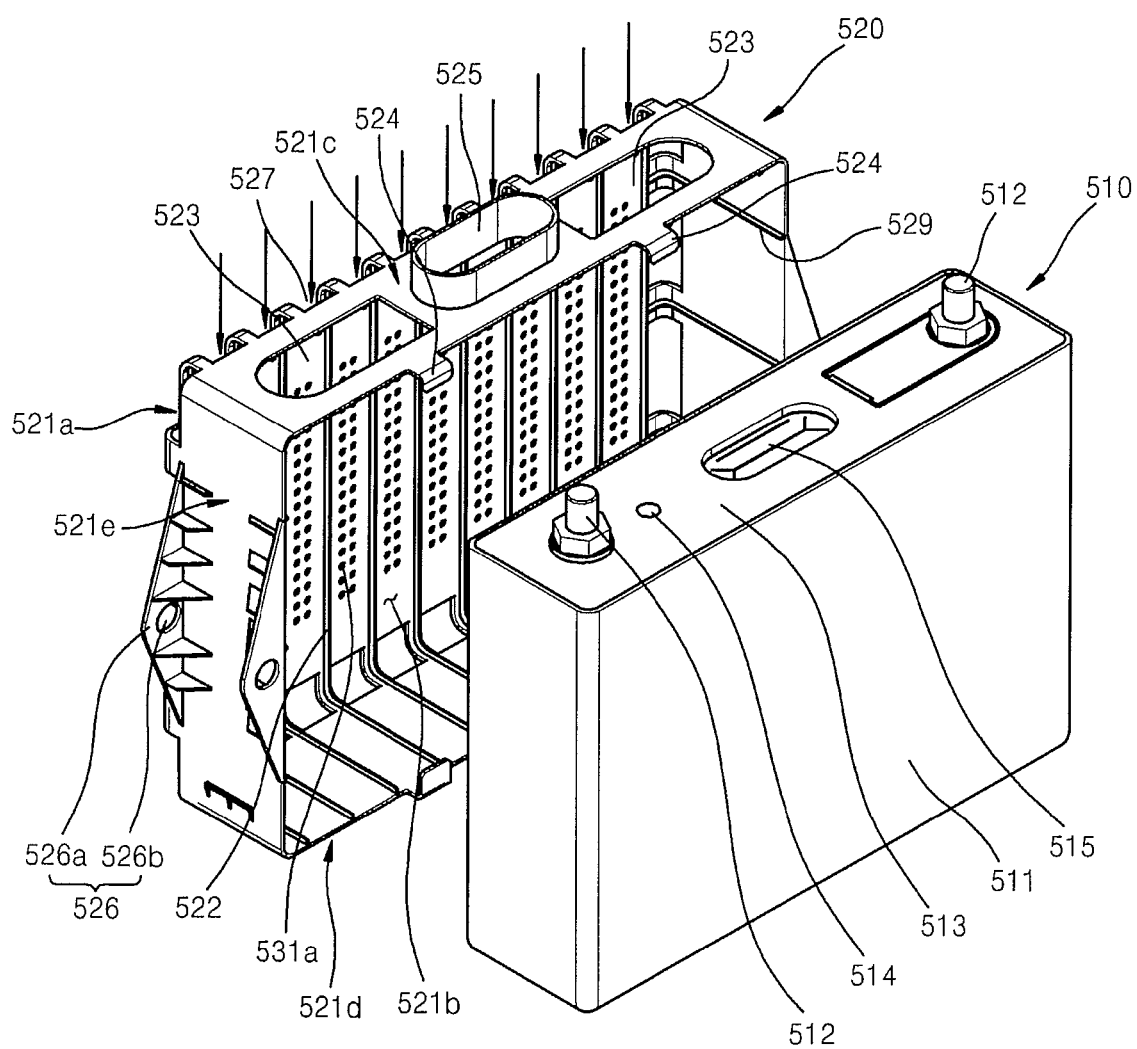
FIG. 7 is a perspective view of a battery unit in which a battery cell is in a cell cover in the battery pack of FIG. 1, according to another embodiment of the present invention.

In FIGS. 1 through 6, the slits 531 are formed in the spaces between the adjacent vertical ribs 522 of the first surface 521a of the cover body 521, but the present invention is not limited thereto. That is, as illustrated in FIG. 7, heat generated from the battery cell 510 of the adjacent battery unit 500 that is stacked adjacent to the battery unit 500 may be effectively transmitted to the air path 532 via through-holes 531a formed in the first surface 521a, instead of the slits 531.

The battery cell 510 may be inserted into or ejected from the cell cover 520 through an opened side on the second surface 521b. The battery cell 510 in the cell cover 520 may contact the first surface 521a of the cell cover 520 or the radiation sheet 540 of the adjacent battery unit 500 that is stacked adjacent to the battery unit 500, through the opened side on the second surface 521b.

The cell cover 520 may include cell supporting units 524. The cell supporting units 524 may be formed so as to protrude from at least one of the upper surface 521c and the lower surface 521d towards the battery cell 510 inserted into the cell cover 520. In this case, the cell supporting units 524 may be integrally formed with at least one of the upper surface 521c and the lower surface 521d.

The cell supporting units 524 may be flexible so that the battery cell 510 may be inserted into the cell cover 520 when the cell supporting units 524 protrude from at least one of the upper surface 521c and the lower surface 521d. In this case, the cell supporting units 524 may flexibly support the battery cell 510 in the cell cover 520 towards the inside of the cell cover 520.

The upper surface 521c may protect an upper portion of the battery cell 510 from the outside. The terminal insertion holes 523 may be formed in the upper surface 521c so as to expose the electrode terminals 512 to the outside. The terminal insertion holes 523 are through holes formed through the upper surface 521c of the cover body 521 so that the electrode terminals 512 of the battery cell 510 are inserted into the terminal insertion holes 523 so as to expose the electrode terminals 512 to the outside.

The gas exhausting unit 525 may be formed on the upper surface 521c so as to exhaust gas generated in the battery cell 510. The gas exhausting unit 525 may be formed with a duct shape, and may be connected to an external duct so as to exhaust gas generated in the battery cell 510 to the outside.

In one embodiment, the gas exhausting unit 525 may be formed as a through-hole on an upper surface of the cover body 521 so as to correspond to the vent member 515 of the battery cell 510 in the cell cover 520.

In addition, the air inlet 527 connected to the air path 532 may be formed in the upper surface 521c. The air inlet 527 may be formed as at least one through-hole on the upper surface 521c of the cover body 521, or on an edge joining the upper surface 521c and the first surface 521a.

The lower surface 521d may protect and support the battery cell 510 from below. When the battery module 100 is mounted on the frame 200, the lower surface 521d may contact the frame 200.

The air outlet 528 connected to the air path 532 may be formed on the lower surface 521d. The air outlet 528 may be formed as at least one through-hole on the lower surface 521d of the cover body 521, or on an edge joining the lower surface 521d and the first surface 521a.

Both lateral surfaces 521e may support and protect the battery cell 510 from the sides. In addition, the adjacent battery units 500 may be connected and supported by the lateral surfaces 521e.

A horizontal rib 529 may be formed on an internal surface of the cover body 520 opposite to the lateral surface 521e, and the internal surface contacts the battery cell 510. Due to the horizontal rib 529, the internal surface is spaced apart from the battery cell 510 by an interval (e.g., a predetermined interval), and an air path for circulating air may be formed in a space between the battery cell 510 and the internal surface of the cell cover 520. Therefore, heat generated from the battery cell 510 may be effectively emitted through the air path.

In one embodiment, a through-hole 530 may be formed through the lateral surface 521e of the cover body 521 or an edge joining the lateral surface 521e and the first surface 521a. The through-hole 530 may be connected to the air path formed between the battery cell 510 and the internal surface.

The assembly unit 526 may be coupled to that of another adjacent battery unit 500 so as to fix the battery units 500 together. The assembly unit 526 may be formed on the lateral surface 521e of the cell cover 520 so as to connect the battery cells 510 to each other, and support and fix the battery cell 510 from its side.

The assembly unit 526 may include an assembly plate 526a and an assembly hole 526b. The assembly plate 526a may be formed so as to protrude from the lateral surface 521e of the cell cover 520. In one embodiment, the assembly plate 526a may be formed like a plate that is integrally formed with the cell cover 520. The battery unit 500 including the cell cover 520 in which the battery cell 510 is installed may be stacked together with other battery units 500 by the assembly plates 526a.

The assembly hole 526b may be formed through the assembly plate 526a. The assembly bar 400 is inserted through the assembly hole 526b formed in each of the battery units 500 that are horizontally stacked so that the battery units 500 are connected to each other and supported. That is, the assembly bar 400 may support and fix the battery units 500 from the side when the battery units 500 are horizontally stacked.

Thus, the battery module 100 may be formed by simply and easily stacking the battery units 500 guided by the assembly bar 400 and the assembly unit 526. In addition, the assembly bar 400 may strongly support and fix the battery units 500 so as to stack the battery units 500.

The cell cover 520 may further include lateral surface fixation units 550. The lateral surface fixation units 550 are supported by the frame 200 so that the movement of the battery unit 500 may be restricted in at least one direction. In one embodiment, the lateral surface fixation units 550 may be formed on the lateral surface 521e of the cell cover 520.

The lateral surface fixation units 550 may be fixation hooks that are inserted into battery unit supporting units 240 such as hook insertion grooves or suitable openings formed on the frame 200. In one embodiment, the lateral surface fixation units 550 (e.g., fixation hooks) are coupled to the battery unit supporting units 240 (e.g., hook insertion grooves) so that the cell cover 520 is supported by the frame 200.

Figure 8:
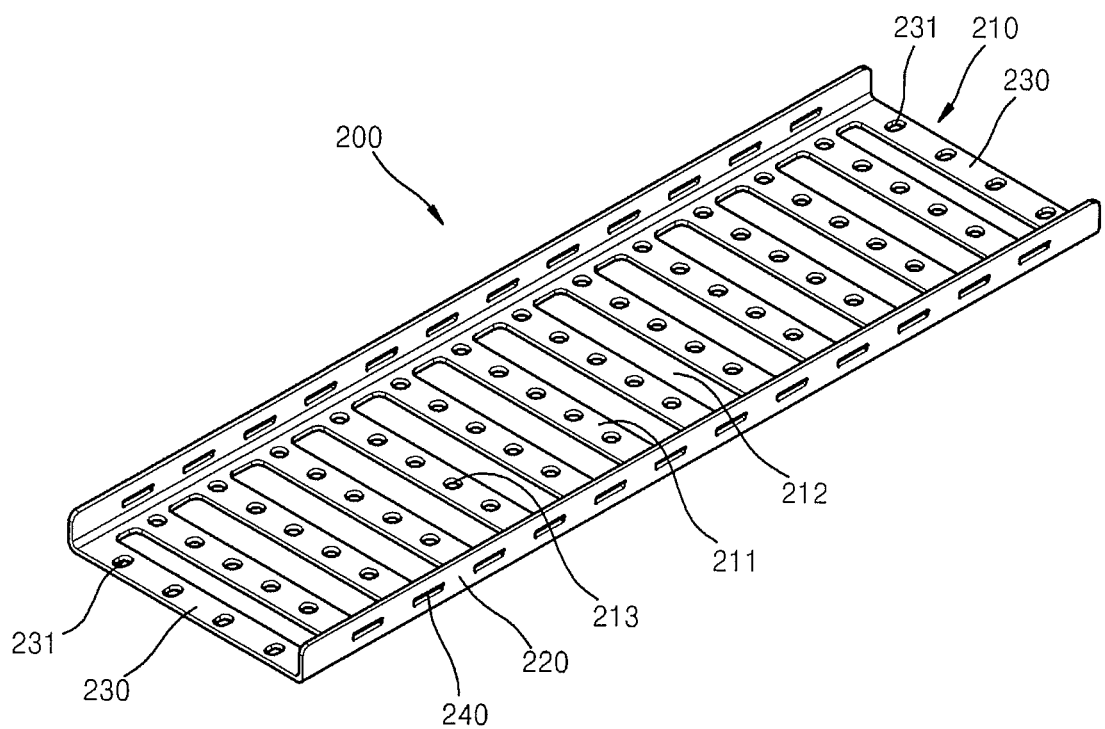
FIG. 8 is a perspective view of a frame for supporting battery module, which is formed by stacking battery units, from below in the battery pack of FIG. 1, according to an embodiment of the present invention.
Figure 9:
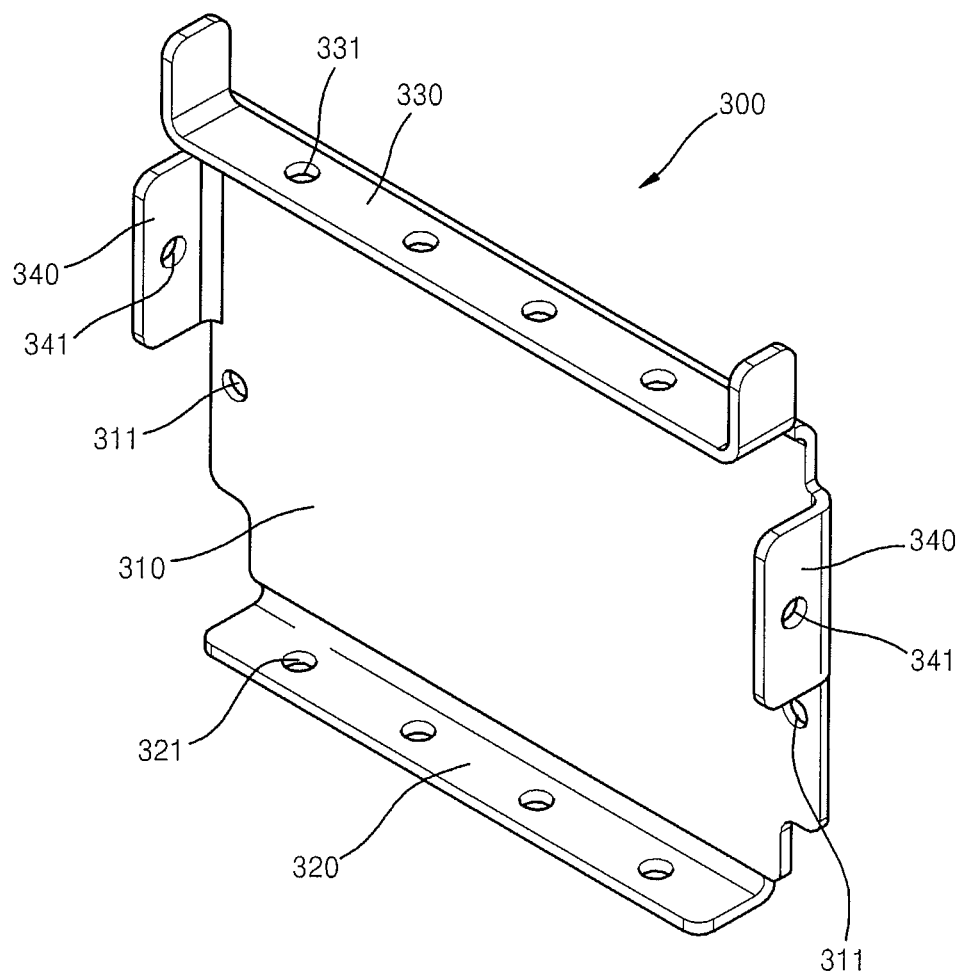
FIG. 9 is a perspective view of a cover plate of the battery pack of FIG. 1, according to an embodiment of the present invention.

FIG. 8 is a perspective view of the frame 200 for supporting the battery module 100, which is formed by stacking the battery units 500, from below in the battery pack 10 of FIG. 1, according to an embodiment of the present invention. FIG. 9 is a perspective view of the cover plate 300 of the battery pack 10 of FIG. 1, according to an embodiment of the present invention.

Figure 10:
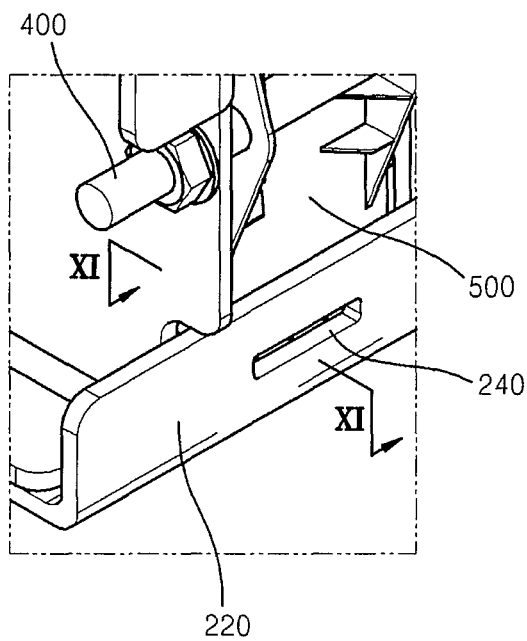
FIG. 10 illustrates a battery unit supported by battery unit supporting units of a lateral frame in the battery pack of FIG. 1, according to an embodiment of the present invention.
Figure 11:
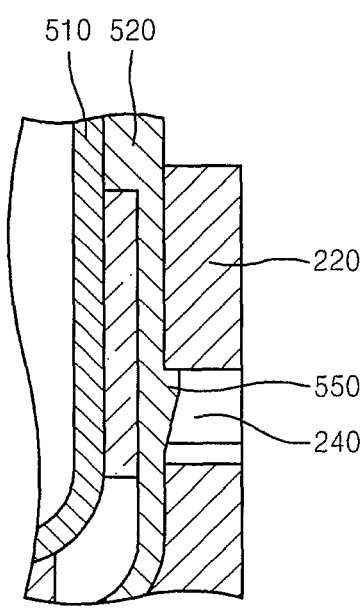
FIG. 11 is a cross-sectional view of the battery pack taken along a line XI-XI of FIG. 10, according to an embodiment of the present invention.
Figure 12:
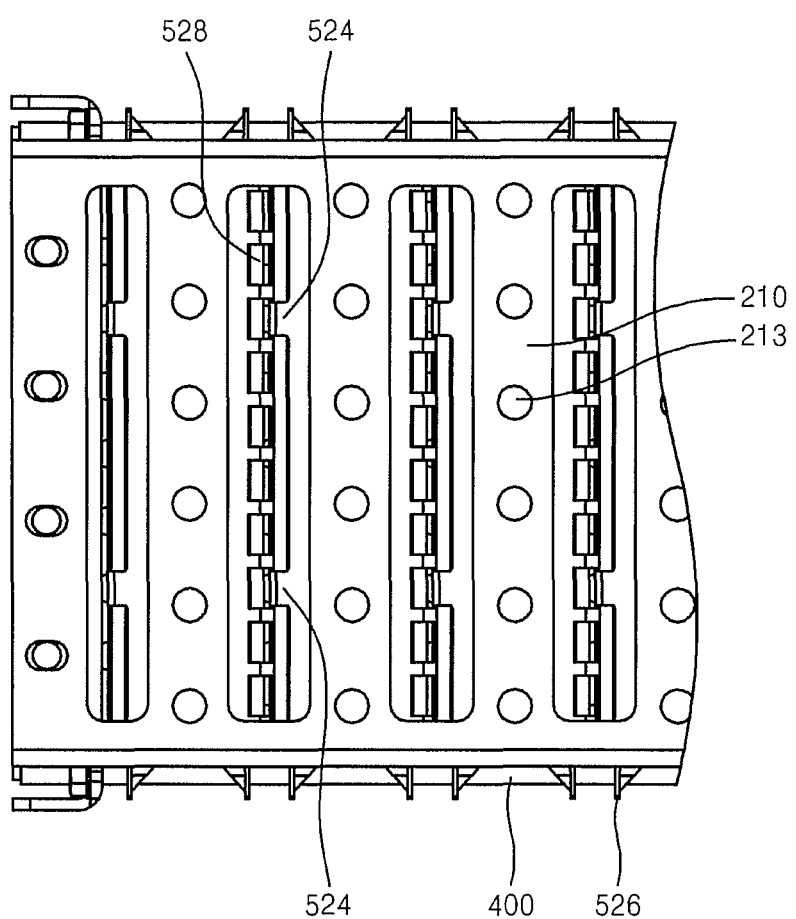
FIG. 12 is a plan view of a portion of a frame of the battery pack of FIG. 1, which is viewed from below, according to an embodiment of the present invention.

FIG. 10 illustrates the case where the battery unit 500 is supported by the battery unit supporting units 240 of a lateral frame 220 in the battery pack 10, according to an embodiment of the present invention. FIG. 11 is a cross-sectional view of the battery pack 10 taken along a line XI-XI of FIG. 10, according to an embodiment of the present invention. FIG. 12 is a plan view of a portion of the frame 200 of the battery pack 10, which is viewed from below, according to an embodiment of the present invention.

By mounting the battery module 100 on the frame 200, the battery module 100 may be effectively supported and fixed from below. The frame 200 may support and fix the battery units 500 so that the battery units 500 are effectively stacked. In addition, air may be effectively exhausted from the battery units 500 through a lower portion of the frame 200.

The frame 200 may include a lower frame 210, a lateral frame 220, and cover plate assembling units 230.

By mounting the battery module 100 on the lower frame 210, the battery module 100 may be supported from below. The lateral frame 220 extends from the lower frame 210 along a lateral surface of the battery unit 500 so as to support and fix the battery module 100 from the side of a lower portion of the battery module 100. The cover plate assembling units 230 may be disposed at both ends of the lower frame 210 so as to support the cover plates 300.

By mounting the battery module 100 on the lower frame 210, the battery module 100 may be supported and fixed from below.

Air path slits 212 or suitable openings may be further formed in the lower frame 210. The air path slits 212 may be formed through positions of the lower frame 210 that correspond to the battery units 500.

As illustrated in FIG. 12, the air path slits 212 may be formed so as to correspond to the air outlets 528 formed on a lower surface of the battery unit 500. Thus, air exhausted through the air path 532 of the battery unit 500 may be effectively exhausted through the air path slits 212 formed in the lower frame 210. Therefore, the performance of heat dissipation of the battery cells 510 that are horizontally stacked to be mounted on the frame 200 may be improved.

As illustrated in FIG. 8, at least one through-hole 213 may be formed through the lower frame 210. Due to the through holes 213 formed through the lower frame 210, the weight of the frame 200 may be reduced, and heat transmitted from the battery units 500 may be effectively emitted.

The lateral frame 220 extends from the lower frame 210 along a lateral surface of the battery unit 500 so as to support and fix the battery module 100 from the side of a lower portion of the battery module 100. In order to effectively support the battery units 500, the battery unit supporting units 240 may be formed on positions of the lateral frame 220, which correspond to the battery units 500.

The battery unit supporting units 240 are coupled to lateral surface fixation units 550 of the cell cover 520 so as to support the battery unit 500. In one embodiment, the battery unit supporting units 240 may be hook insertion grooves for receiving the lateral surface fixation units 550 embodied as fixation hooks. In this embodiment, the hook insertion grooves are coupled to the fixation hooks so that the cell cover 520 is supported by the lower frame 210.

Thus, the lateral surface fixation units 550 are supported by the battery unit supporting units 240 of the frame 200 so that the movement of the battery unit 500 may be restricted in at least one direction. According to one embodiment, the lateral surface fixation units 550, which may be fixation hooks, are inserted into the battery unit supporting units 240, which may be hook insertion grooves, so that the movement of the battery unit 500 may be restricted in a horizontal direction. Thus, the battery unit 500 may be effectively supported by the frame 200.

The cover plate assembling units 230 may be disposed at both ends of the lower frame 210 so as to support and fix the cover plates 300. The cover plate assembling units 230 fixe the cover plates 300 so that the battery module 100 in which the battery units 500 are stacked and supported by the cover plates 300 may be effectively supported.

As illustrated in FIG. 8, a plurality of coupling holes 231 may be formed in the cover plate assembling unit 230 disposed at both ends of the lower frame 210. The coupling holes 231 may be formed so as to correspond to coupling holes 321 of the cover plate 300.

As illustrated in FIG. 1, the cover plate assembling unit 230 and the cover plate 300 are coupled through the coupling holes 231 and 321 that are respectively formed in the cover plate assembling unit 230 and the cover plate 300 so as to be coupled and fixed by coupling elements. The coupling elements may include a bolt and a nut that are coupled together through the coupling holes 231 and 321. Thus, the cover plate 300 may be effectively supported by and fixed to the cover plate assembling unit 230.

The cover plates 300 may be disposed at both ends of the battery module 100 so as to horizontally support and fix the battery module 100 in which the battery units 500 are horizontally stacked. The cover plates 300 may be disposed at both ends of the battery module 100 formed by stacking the battery units 500 so as to support the battery module 100 so that the battery units 500 are maintained to contact each other.

Referring to FIG. 9, the cover plate 300 may include a lateral plate 310, a lower supporting unit 320, an upper connection unit 330, and a lateral connection unit 340.

The lateral plate 310 contacts one surface of the battery unit 500 so as to support the battery unit 500 from the side. The lower supporting unit 320 is accommodated in and supported by the cover plate assembling unit 230 of the lower frame 210 disposed below the cover plate 300. The upper connection unit 330 supports another battery pack stacked above the battery pack 10 when a plurality of battery packs are vertically stacked. The lateral connection unit 340 supports another battery pack stacked next to the battery pack 10 when a plurality of battery packs are horizontally stacked.

The lateral plate 310 may be disposed at both ends of the battery module 100 formed by stacking the battery units 500 so as to support the battery module 100 so that the battery units 500 are maintained to contact each other.

In one embodiment, assembly holes 311 may be formed in the lateral plate 310. The assembly holes 311 may be formed in a position of the lateral plate 300, in which assembly bars 400 are to be inserted. The assembly bars 400 may be inserted into the assembly holes 311 so as to be assembled and supported with the battery module 100. According to another embodiment of the present invention, the assembly bars 400 that are inserted into the assembly holes 311 so that the battery module 100 is supported by the cover plate 300 may be supported by and fixed to the lateral plate 310 by coupling elements such as screwed bolt and nut.

The lower supporting unit 320 of the cover plate 300 is on the cover plate assembling unit 230 of the lower frame 210 disposed below the cover plate 300 so as to be supported and fixed. In one embodiment, coupling holes 321 may be formed in the lower supporting unit 320.

The coupling holes 321 may be formed so as to correspond to the coupling holes 231 formed in the cover plate assembling unit 230. The coupling holes 321 may be coupled to the coupling holes 231 of the cover plate assembling unit 230 by a coupling element 350 such as a bolt and a nut so that the cover plate 300 is fixed to the frame 200.

The upper connection unit 330 may support and fix another battery pack when a plurality of battery packs are vertically stacked. The upper connection unit 330 may be coupled to a lower surface of a cover plate assembling unit of a lower frame 210 of another battery pack that is stacked above the battery pack 10.

In one embodiment, coupling holes 331 may be formed in the upper connection unit 330. The coupling holes 331 may be formed to correspond to the coupling holes 231 of cover plate assembling unit of the lower frame of the battery pack that is stacked above the battery pack 10. The coupling holes 331 may be coupled to the coupling holes 231 of the cover plate assembling unit 230 by coupling elements such as a bolt and a nut so that the upper connection unit 330 is fixed to the cover plate assembling unit of the lower frame of the battery pack that is stacked above the battery pack 10.

The lateral connection unit 340 may support and fix another battery pack when a plurality of battery packs are horizontally stacked. The lateral connection unit 340 may be coupled to a lateral connection unit 340 of a battery pack that is stacked next to the battery pack 10.

In one embodiment, a coupling hole 341 may be formed in the lateral connection unit 340. The coupling hole 341 may be disposed so as to correspond to a coupling hole of a lateral connection unit of the battery pack that is stacked next to the battery pack 10. The coupling hole 341 may be coupled to the coupling hole of the lateral connection unit of the next battery pack by coupling elements such as a bolt and a nut so that the lateral connection unit 340 is fixed to the lateral connection unit of the next battery pack.

By the cover plate 300, at least two battery packs may be stacked in at least one of horizontal and vertical directions so as to be easily supported by each other, and thus the manufacture of an assembly battery pack may be completed.

According to the described embodiments of the present invention, in a battery pack including at least one battery cell, the insulating and cooling properties between battery cells may be improved.

While the inventive concept of the present invention has been particularly shown and described with reference to exemplary embodiments thereof, it will be understood that various changes in form and details may be made therein without departing from the spirit and scope of the following claims and their equivalents.

What is claimed is:

1. A battery unit comprising:
 a battery cell having a surface extending continuously between two opposite lateral edges, and comprising at least one electrode terminal extending vertically from a top or bottom of the battery cell; and
 a cover body comprising a first insulating wall, a second insulating wall, and a third insulating wall, the first insulating wall comprising a plurality of protrusions contacting the surface of the battery cell, the protrusions each extending substantially vertically over the substantially entire length between opposite top and bottom edges of the first insulating wall and defining space between the battery cell and regions between the protrusions, a surface of at least one of the protrusions contacting the surface of the battery cell along an entire width of the protrusion and extending in the vertical direction,
 wherein the second insulating wall protrudes from the bottom edge of the first insulating wall in a same direction as the protrusions, and the third insulating wall protrudes from the top edge of the first insulating wall in a same direction as the protrusions,
 wherein the cover body has openings, each opening having four walls defined by the first insulating wall and the second insulating wall, and extending between the first insulating wall and the second insulating wall along the bottom edge of the first insulating wall, and aligned with the regions between the protrusions,
 wherein the cover body has other openings, each of the other openings having four walls defined by the first insulating wall and the third insulating wall, and extending between the first insulating wall and the third insulating wall along the top edge of the first insulating wall, and aligned with the regions between the protrusions,
 wherein the first insulating wall has a plurality of second openings at the regions between the openings and the other openings, and
 wherein each of the protrusions further extends from the bottom edge of the first insulating wall to a bottom inner surface of the second insulating wall and from the top edge of the first insulating wall to a top inner surface of the third insulating wall.

2. The battery unit of claim 1, wherein the third insulating wall further comprises at least one supporting member protruding from an edge thereof for holding the battery cell against the protrusions.

3. The battery unit of claim 1, wherein the second insulating wall comprises at least one supporting member protruding from an edge thereof for holding the battery cell against the protrusions.

4. The battery unit of claim 1, wherein the openings and the other openings are aligned with each other.

5. The battery unit of claim 1, wherein the plurality of protrusions are parallel to each other.

6. The battery unit of claim 1, wherein the plurality of second openings comprises a plurality of elongated openings aligned with the openings and extending at least partly between the opposite top and bottom edges of the first insulating wall.

7. The battery unit of claim 1, wherein the plurality of second openings comprises a plurality of holes aligned with the openings and spaced apart from each other between the opposite top and bottom edges of the first insulating wall.

8. The battery unit of claim 1,
 wherein the third insulating wall has an opening aligned with a vent member of the battery cell.

9. The battery unit of claim 1, further comprising a radiation sheet on a side of at least one of the first insulating wall or the second insulating wall opposite the side on which the protrusions are located.

10. The battery unit of claim 1, wherein an area at which the first insulating wall and the second insulating wall meet has a gradual curve.

* * * * *